United States Patent
Mapkar et al.

(10) Patent No.: US 10,435,539 B2
(45) Date of Patent: Oct. 8, 2019

(54) MULTI ADDITIVE MULTIFUNCTIONAL COMPOSITE FOR USE IN A NON-METALLIC FUEL CONVEYANCE SYSTEM

(71) Applicant: Eaton Corporation, Cleveland, OH (US)

(72) Inventors: Javed Mapkar, Commerce Township, MI (US); Kenneth Phaneuf, Chelsea, MI (US); Soumayajit Sarkar, Farmington Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 181 days.

(21) Appl. No.: 14/891,529

(22) PCT Filed: May 14, 2014

(86) PCT No.: PCT/US2014/037994
§ 371 (c)(1),
(2) Date: Nov. 16, 2015

(87) PCT Pub. No.: WO2014/186460
PCT Pub. Date: Nov. 20, 2014

(65) Prior Publication Data
US 2016/0090469 A1 Mar. 31, 2016

Related U.S. Application Data

(60) Provisional application No. 61/823,109, filed on May 14, 2013, provisional application No. 61/935,976, (Continued)

(51) Int. Cl.
*C08K 7/18* (2006.01)
*C08K 3/04* (2006.01)
(Continued)

(52) U.S. Cl.
CPC .............. *C08K 7/18* (2013.01); *C08K 3/04* (2013.01); *C08K 3/36* (2013.01); *C08K 7/00* (2013.01);
(Continued)

(58) Field of Classification Search
CPC .......... C08L 77/02; C08L 71/00; C08L 79/04; C08L 71/02; C08G 2650/40;
(Continued)

(56) References Cited

U.S. PATENT DOCUMENTS

2003/0151030 A1 8/2003 Gurin
2005/0070657 A1 3/2005 Elkovitch et al.
(Continued)

FOREIGN PATENT DOCUMENTS

EP 1626066 A1 2/2006
EP 2682262 A1 1/2014
(Continued)

OTHER PUBLICATIONS

International Search Report for PCT/US2014/037994, dated Sep. 17, 2014, 3 pages.
(Continued)

*Primary Examiner* — Camie S Thompson
(74) *Attorney, Agent, or Firm* — Benesch Friedlander Coplan & Aronoff LLP (57) ABSTRACT

A multifunctional composite material may include a polymer matrix, at least one nano-additive, micro-additive, and/or a spherical nano-additive. The non-metallic composite material may be used to make non-metallic parts for fuel conveyance systems for use in aircraft.

23 Claims, 11 Drawing Sheets

Related U.S. Application Data filed on Feb. 5, 2014, provisional application No. 61/935,980, filed on Feb. 5, 2014.

(51) Int. Cl.

| | | |
|---|---|---|
| *C08K 7/24* | (2006.01) | |
| *C08K 7/06* | (2006.01) | |
| *C08K 7/00* | (2006.01) | |
| *C09K 5/08* | (2006.01) | |
| *C08K 3/36* | (2006.01) | |
| *C08L 77/02* | (2006.01) | |
| *C08K 7/16* | (2006.01) | |
| *C08K 7/14* | (2006.01) | |
| *C08G 73/10* | (2006.01) | |
| *C08G 73/14* | (2006.01) | |
| *C08G 73/18* | (2006.01) | |
| *C08L 79/04* | (2006.01) | |
| *C08L 79/08* | (2006.01) | |

(52) U.S. Cl.
CPC .............. *C08K 7/06* (2013.01); *C08K 7/14* (2013.01); *C08K 7/16* (2013.01); *C08K 7/24* (2013.01); *C08L 77/02* (2013.01); *C09K 5/08* (2013.01); *C08G 73/1046* (2013.01); *C08G 73/14* (2013.01); *C08G 73/18* (2013.01); *C08G 2650/40* (2013.01); *C08K 2201/011* (2013.01); *C08K 2201/016* (2013.01); *C08L 79/04* (2013.01); *C08L 79/08* (2013.01)

(58) Field of Classification Search
CPC .... C08G 73/1046; C08G 73/14; C08G 73/18; C08K 3/04; C08K 7/06; C08K 7/14; C08K 7/18; C08K 7/24; C08K 7/00; C08K 7/16; C08K 3/36; C08K 2201/011; C08K 2201/016; C08K 2201/106
USPC ........ 252/75; 428/292.1, 36.4, 297.4, 297.7; 977/773

See application file for complete search history.

(56) References Cited

U.S. PATENT DOCUMENTS

| | | | |
|---|---|---|---|
| 2007/0213475 A1* | 9/2007 | Bushelman | C08L 77/00 525/509 |
| 2013/0206273 A1* | 8/2013 | Guest | B82Y 30/00 138/174 |
| 2014/0091253 A1* | 4/2014 | Myllymaki | C08K 7/02 252/75 |
| 2014/0339780 A1* | 11/2014 | Mazyar | E21B 43/128 277/590 |
| 2016/0102188 A1* | 4/2016 | Myllymaki | C08K 3/38 252/75 |

FOREIGN PATENT DOCUMENTS

| | | |
|---|---|---|
| WO | 2008048705 A2 | 1/2014 |
| WO | 2014/186460 A1 | 11/2014 |

OTHER PUBLICATIONS

Written Opinion for PCT/US2014/037994, dated Sep. 17, 2014, 8 pages.

* cited by examiner

MULTI ADDITIVE MULTIFUNCTIONAL COMPOSITE FOR USE IN A NON-METALLIC FUEL CONVEYANCE SYSTEM

RELATED APPLICATIONS

This application claims priority to U.S. Provisional Application No. 61/823,109 filed on May 14, 2013, entitled "Non-Metallic Fuel Conveyance System," U.S. Provisional Application No. 61/935,976 filed on Feb. 5, 2014, entitled "Short Fiber Reinforced Composition Including Nano-additives," and U.S. Provisional Application No. 61/935,980 filed on Feb. 5, 2014, entitled "Improved Composition Including Spherical Nano-additives," all of which are hereby incorporated by reference.

FIELD OF INVENTION

The present disclosure relates to an improved multifunctional polymer composite that may be used to develop non-metallic fuel conveyance systems for the aerospace industry. More particularly, the present disclosure relates to an improved multifunctional polymer composite including tubular, platelet, or spherical nano-additive and/or micro-filler additives.

BACKGROUND

Polymer composites have been used to form relatively light-weight airframes for aircraft, such as the Boeing 787. These airframes, however, must also include a metal mesh embedded in the outer layer of the composite that may add at least 200 pounds of weight to the airframe. The metal mesh is necessary to safeguard the aircraft's fuel and hydraulic conveyance systems, which are predominantly made of metal, and in the absence of the mesh may act to attract lightning. In order to increase fuel efficiency of the aircraft and to eliminate or greatly reduce the likelihood of a lightning strike, it would be beneficial to eliminate the metal mesh and form the fuel and hydraulic conveyance systems of non-metallic material that meets all of the structural requirements for the aerospace industry.

SUMMARY OF THE INVENTION

A multifunctional polymer composite material may include from about 60% to about 99% of a polymer matrix, about 0.2% to about 5% of at least one spherical nano-additive and 1) from about 0.5% to about 6% of at least one non-spherical nano-additive or 2) from about 5% to about 35% of a micro-additive.

In another embodiment, the multifunctional polymer composite material includes from about 60% to about 99% of a polymer matrix, about 0.3% to about 6% of a first nano-additive and from about 15% to about 35% of a short fiber micro-additive. The multifunctional polymer composite material may also include a second nano-additive.

In another embodiment, the multifunctional polymer composite material may include from about 60% to about 99% of a polymer matrix, about 0.3% to about 6% of a first nano-additive and from about 0.3% to about 6% of a second nano-additive. The multifunctional polymer composite material may also include from about 15% to about 30% of a micro-additive.

The multifunctional polymer composite material may be used to form parts for a non-metallic fuel conveyance system, such as tubes, hoses, low pressure ducting, couplings, brackets, clamps, and pump housings.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
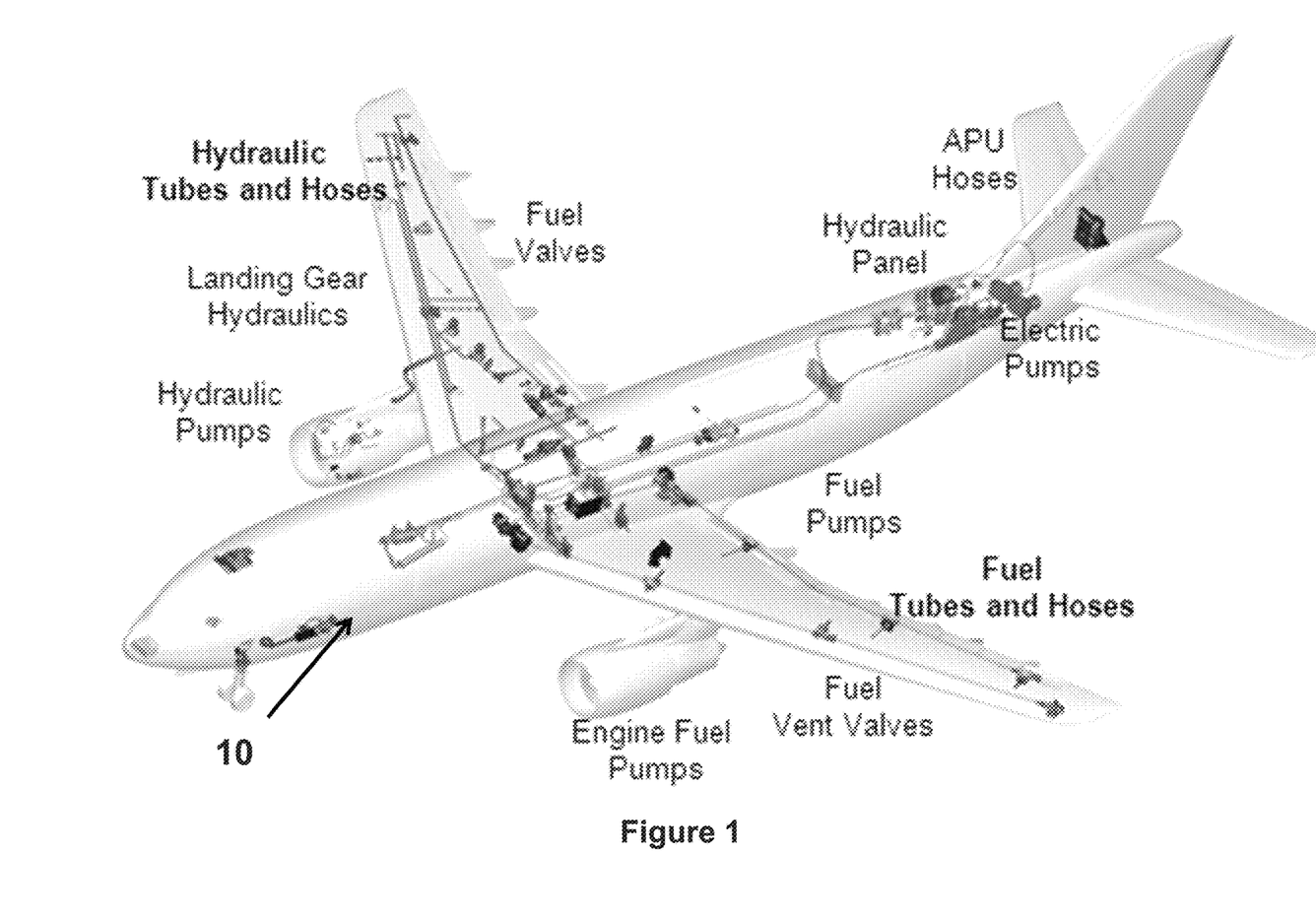
FIG. 1 is a perspective view of an airframe, including elements of fuel and hydraulic conveyance systems.

An improved multifunctional polymer composite may be used to make non-metallic components of an aircraft fuel conveyance system. Although the composites will be described for use in an aircraft, it should be understood that the composite materials may be useful for many different applications. FIG. 1 is a perspective view of an airframe 10 of an example aircraft. In one embodiment, the airframe of an aircraft is its mechanical structure. It typically includes the fuselage, wings, and undercarriage of the aircraft. The airframe may be made of a variety of materials, including aluminum, alloys, and most recently polymer composite materials (hereinafter "composite material"). Boeing, for example, manufactures its 787 jetliner with a one-piece carbon-fiber fuselage, replacing about 1,200 sheets of aluminum and 40,000 rivets. The Airbus A380 is also built with a large proportion of composite material.

The use of composite material dramatically decreases the weight and increases the fuel efficiency of the aircraft. However, because the fuel and hydraulic conveyance systems are still made of metal, a metal mesh must be embedded into the composite material to protect the systems (and the aircraft) from potential lightning strikes. This mesh can be eliminated with the use of the improved multifunctional polymer composite, as described herein.

As shown in FIG. 1, the parts of the non-metallic conveyance systems may include the tubes, hoses, low pressure ducting, couplings, brackets, clamps, pump housings, etc., associated with the hydraulic and fuel systems of the aircraft. The parts of these systems may be disposed throughout the aircraft.

The parts of the non-metallic conveyance systems may be either flexible, such as a tube or hose, or rigid, such as a pump housing or bracket, in structure. Each part must have certain structural properties in order to be acceptable for use in the aircraft. These properties include electrical conductivity, increased thermal conductivity, desired strength, stiffness, toughness, electrical stability and chemical resistance to aircraft fluids. For example, both the flexible and rigid parts must have an electrical resistance of from 100 kilohms/sq to 100 mega-ohms/sq to allow dissipation of a static charge but isolate the flow of current during a lightning strike event and the rigid components must have a thermal conductivity of from about or greater than 1 watt per kelvin per meter (W/mk) and about 5 W/mK to dissipate heat.

Table I, below, shows the structural property requirements for the respective parts:

TABLE I

| | Flexible Components | Rigid Component |
|---|---|---|
| Tensile Strength (MPa) | 40-100 MPa | >200 MPa |
| Tensile Modulus (MPa) | ~1.5 GPa | >20 GPa |
| Toughness (J/m3) | >2× of base polymer | >2× of 30 wt % CF |
| Thermal Conductivity (W/mK) | — | LSL > 1 W/mK |
| Electrical Resistance | 100 kΩ/sq to 100 MΩ/sq | 100 kΩ/sq to 100 MΩ/sq |

Composite materials meeting the above referenced structural properties may be obtained by forming a lightweight, multifunctional polymer composite using a multi-additive method. Specifically, by combining nano- and micro-additive fillers of different chemical type and shape with a polymer matrix, a multifunctional polymer composite having the requisite properties may be formed.

In one embodiment, the polymer matrix may include, but is not limited to polyamide (Nylon®), polyetheremide, polyamidemide, polyphenylsulfone, polyetheretherketone (PEEK), polyimide, epoxy, polycarbonate, polysulfone, polyethersulfone, polyethylene therpthalate, polythalamaide, polyetherketone, polyetherketoneketone, polybenzimideazole polytetrafluoroethylene, ethylenetetrafluoro ethylene, other fluoropolymers and fluoroelastomers, and combinations thereof.

Figure 2:
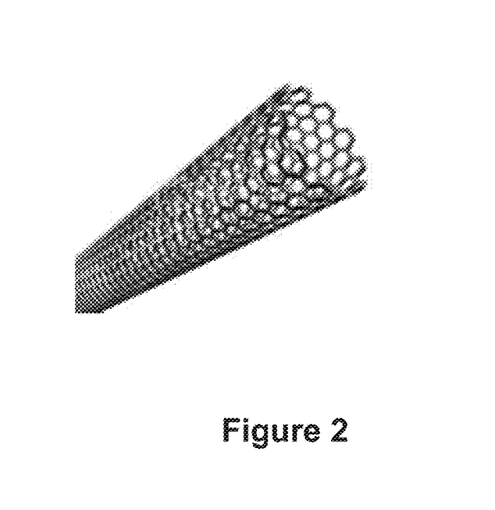
FIG. 2 is a structural representation of one embodiment of a carbon nanotube additive.
Figures 3, 4:
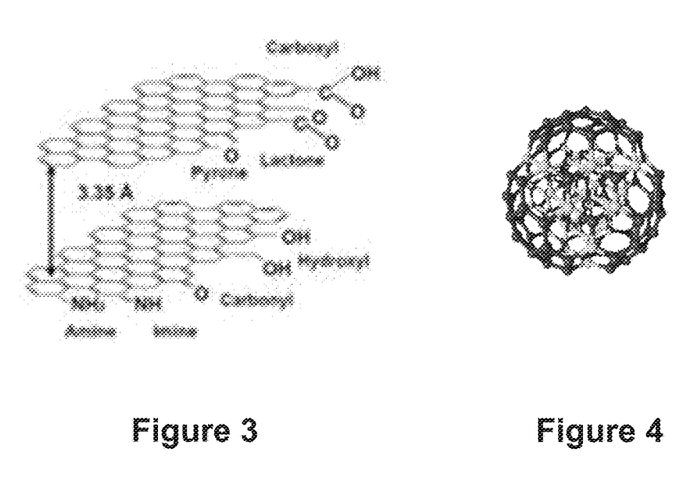
FIG. 3 is a structural representation of one embodiment of graphene nano-platelets additive.
FIG. 4 is a structural representation of one embodiment of a nanodiamond additive.
Figure 6:
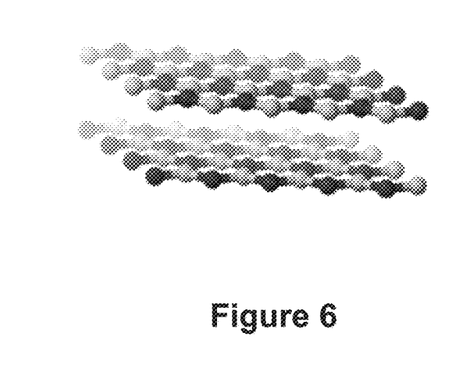
FIG. 6 is a structural representation of one embodiment of a boron nitride or graphite additive.

The nano-additive materials may include, but are not limited to tubular and platelet nano-additives, such as carbon nanotubes (FIG. 2), graphene (FIG. 3), alumina, nanoclay, boron nitride (FIG. 6), carbon nanofibers, boron nanotubes, holloysite nanotubes, alumina nanotube, graphite, and aluminum nitride.

The nano-additives may also include a spherical nano-additives, such as titanium oxide, zirconium oxide, silicon carbide, nanodiamonds (FIG. 4), silicon nanoparticles, aluminum oxide nanoparticles, and silica nanoparticles which may be combined with tubular and platelet type nano- and micro-additive to optimize the characteristics of the multifunctional composite.

Figure 5:
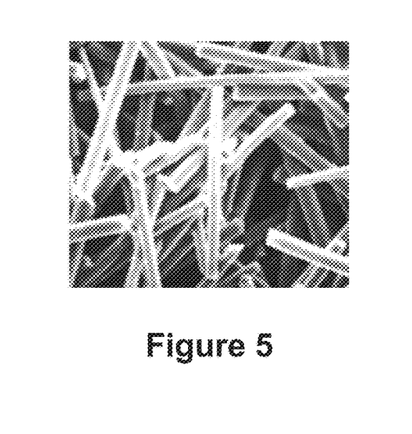
FIG. 5 is a structural representation of one embodiment of a carbon or glass fiber additive.

The micro-additives include, but are not limited to, carbon and glass fibers (FIG. 5), carbon black, talc, mica, and basalt.

Generally, the multifunctional polymer composite may be formed by combining a first nano-additive, a second nano-additive, and a polymer matrix; a first nano-additive, a first micro-additive, and a polymer matrix; or a first nano-additive, a second nano-additive, a first micro-additive, and a polymer matrix. The combinations described above have produced a synergistic effect with regard to the structural properties of the non-metallic composite.

Figure 7:
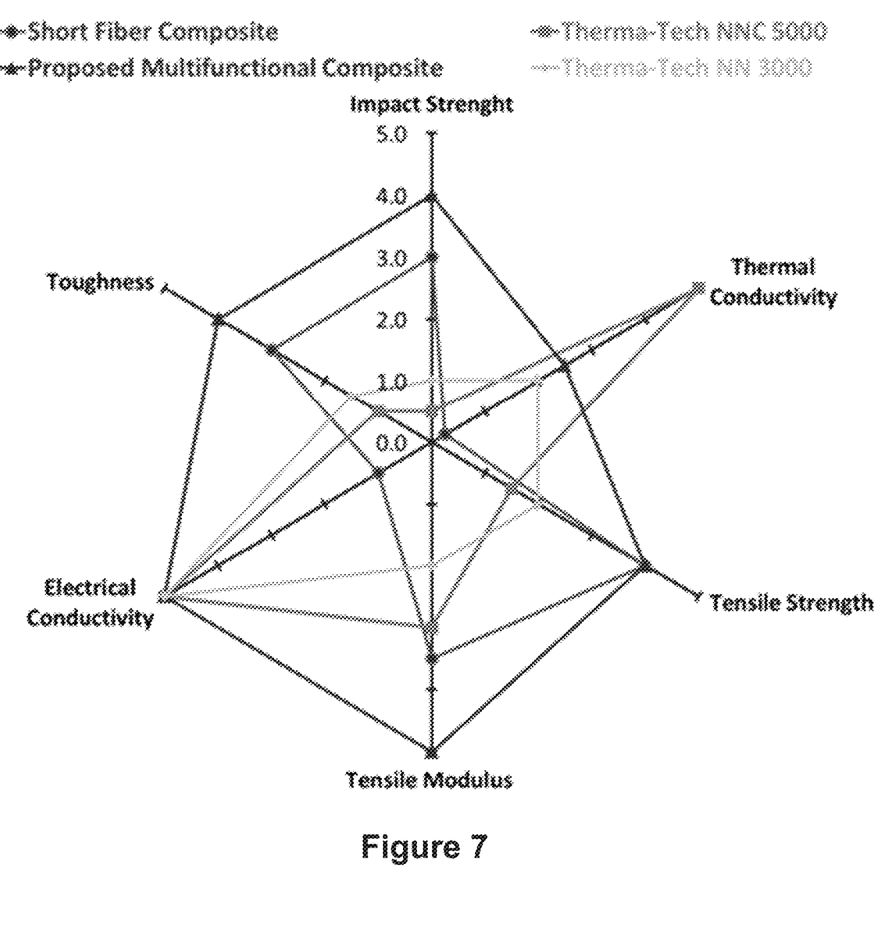
FIG. 7 is a graphical comparison of the structural properties of a proposed multifunctional polymer composite, a short fiber composite, and two commercially available thermally conductive polymers.

The properties of one embodiment of the non-metallic polymer composite were compared with the structural properties of known composites, specifically Therma-Tech NNC 5000® and Therma-Tech NN 3000 (commercially available from PolyOne) and a short fiber composite (carbon fiber and polymer). As shown in FIG. 7, the Therma-Tech® materials were thermally and electrically conductive but not mechanically strong and tough enough to meet non-metallic fuel conveyance requirements. Similarly, the short fiber composite has the desired strength and stiffness, but lacks the necessary electrical and thermal properties. Conversely, the multifunctional polymer composite meets or exceeds all structural property requirements and therefore is suitable for use in the parts of a fuel or hydraulic conveyance system.

Different additives may impart different properties. For example, tubular nano-additives, such as carbon nanotubes, increase mechanical properties, such as stiffness and strength, electrical conductivity, and thermal conductivity. Platelet nano-additives, such as graphene affect stiffness and strength, barrier properties, and may impart electrical and thermal conductivity. Boron nitride improves thermal conductivity and spherical nano-additives, such as nanodiamond, may affect toughness, wear properties, and elongation. Therefore, a multifunctional polymer composite may be tailored to suit the specific properties required of the part and to impart a synergistic effect due to their combination.

Specifically, it has been determined that by combining a spherical nano-additive with a tubular or platelet nano-additive or a micro additive will improve the toughness, modulus, strength, and elongation of certain non-metallic polymer matrices. For examples, a multifunctional polymer composite may be formed by combining a first nano-additive, a spherical nano-additive, and a polymer matrix; a spherical nano-additive, a first micro-additive, and a polymer matrix; or a first nano-additive, a spherical nano-additive, a first micro-additive, and a polymer matrix. Additionally, an additive may be used to improve the dispersion of the additives throughout the polymer matrix. For example, polyhedral oligomeric ailsesquioxane (POSS) may be used by itself as an additive, e.g. octaisobutyl POSS, or as a flow or dispersion additive (e.g. silanol-POSS). In another embodiment, POSS can also be used in combination with sorbitol.

Examples of the combination of a spherical nano-additives with other additives are set forth in Examples 1-4, below.

Example 1

In one example five samples were prepared. A first or control sample was prepared using 100% Nylon 12 (commercially available as Vestamid 1700 from Evonik Industries). A second sample was prepared using about 97% Nylon 12 and about 3% of a multiwall carbon nanotube (commercially available as NC7000 from Nanocyl). Three more samples were then prepared by adding different spherical nano-additives. Sample three included 3% carbon nanotube and 0.34% silica dioxide (commercially available from Gelest, Inc.), sample four included 3% carbon nanotube and 0.57% aluminum oxide (commercially available from Alfa Aesar), and sample five included 2% carbon nanotube and 2% nanodiamond (commercially available from NanoBlox, Inc.).

The samples were prepared by first drying the additives and the polymer to remove residual moisture and dry blending the components to form a uniform mixture. The mixture was fed in to a hopper of a twin screw extruder with the temperature of about 240° C. to about 300° C. and a screw speed of about between 100 rpm to 800 rpm.

The molten stands of the polymer composite were then quenched in water and pelletized to 1 mm to 3 mm composite pellets. To make coupons and tubes for testing, the pellets were dried and then injection molded into various shapes and sizes. The tensile properties of the resulting samples were measured according to ASTM D638, impact properties were measured according to ASTM D256, electrical conductivity was measured according to ASTM D257 and D4496, and thermal conductivity was measured using a hot plate transient source method with a ThermTest TPS2500.

Figure 8:
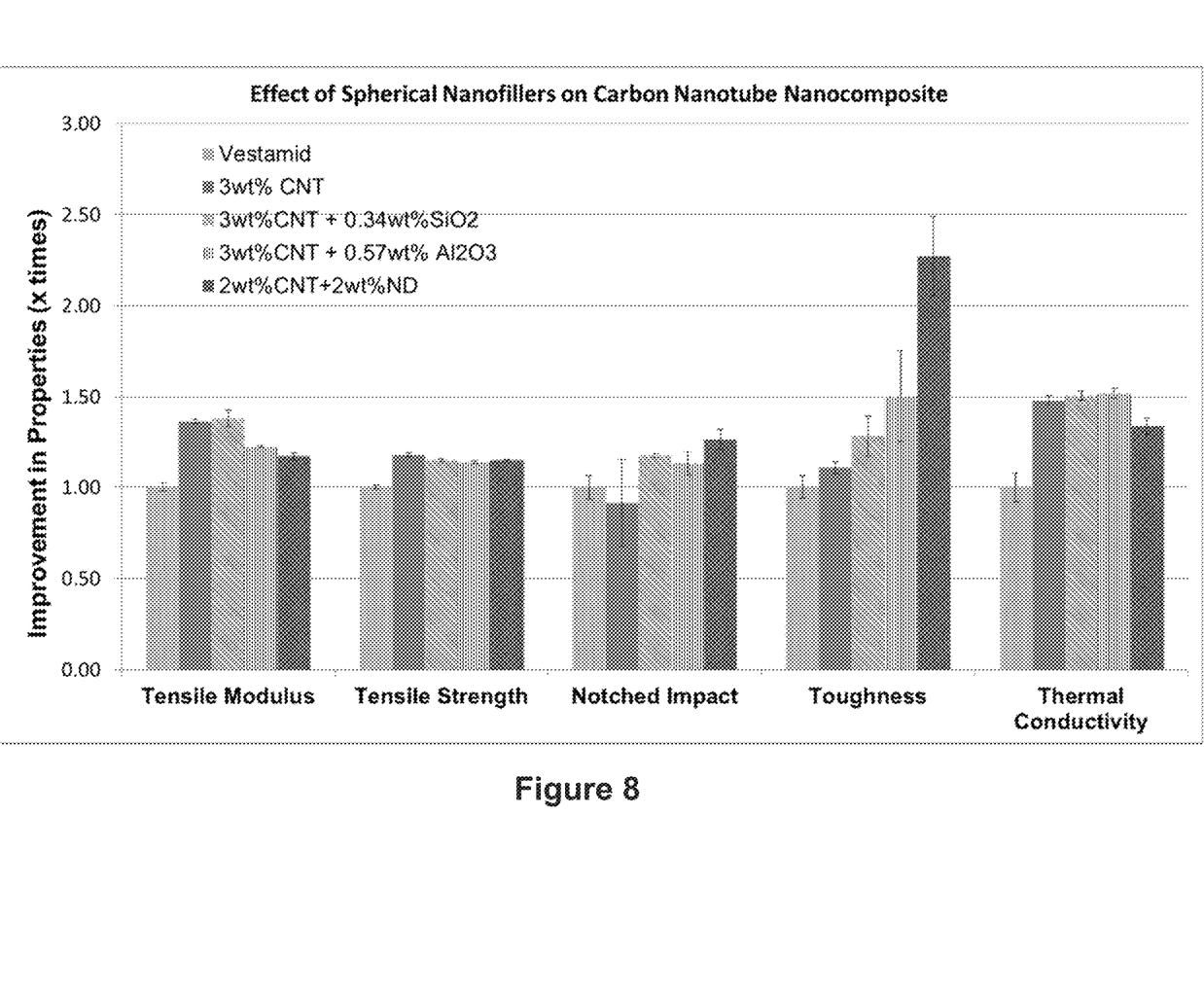
FIG. 8 is a graphical comparison of the effect on the structural properties of a composite when spherical nano-additives are combined with a polymer/carbon nanotube matrix.

As shown in FIG. 8, the spherical nano-additives improved the impact and toughness of the composite materials, while retaining the tensile modulus, tensile stiffness, and thermal conductivity of the carbon nanotube/Nylon 12 composite. Specifically, the combination of nanodiamond more than doubled the toughness of the polymer composite alone. These improvements make the materials enhanced with both tubular nano-additives and spherical nano-additives ideal for use in flexible components of fuel conveyance systems, such as tubes and hoses.

Example 2

In another example five more samples were prepared. A first or control sample was prepared using 100% Nylon 12. A second sample was prepared using about 97% Nylon 12 and about 3% of a nanographene platelet material (commercially available as N006 from Angstron Materials). Sample three included 6% nanographene platelet material, sample four included 3% nanographene platelet material and 0.5% nanodiamond material, and sample five included 2% nanographene platelet material and 2% nanodiamond material.

Figure 9:
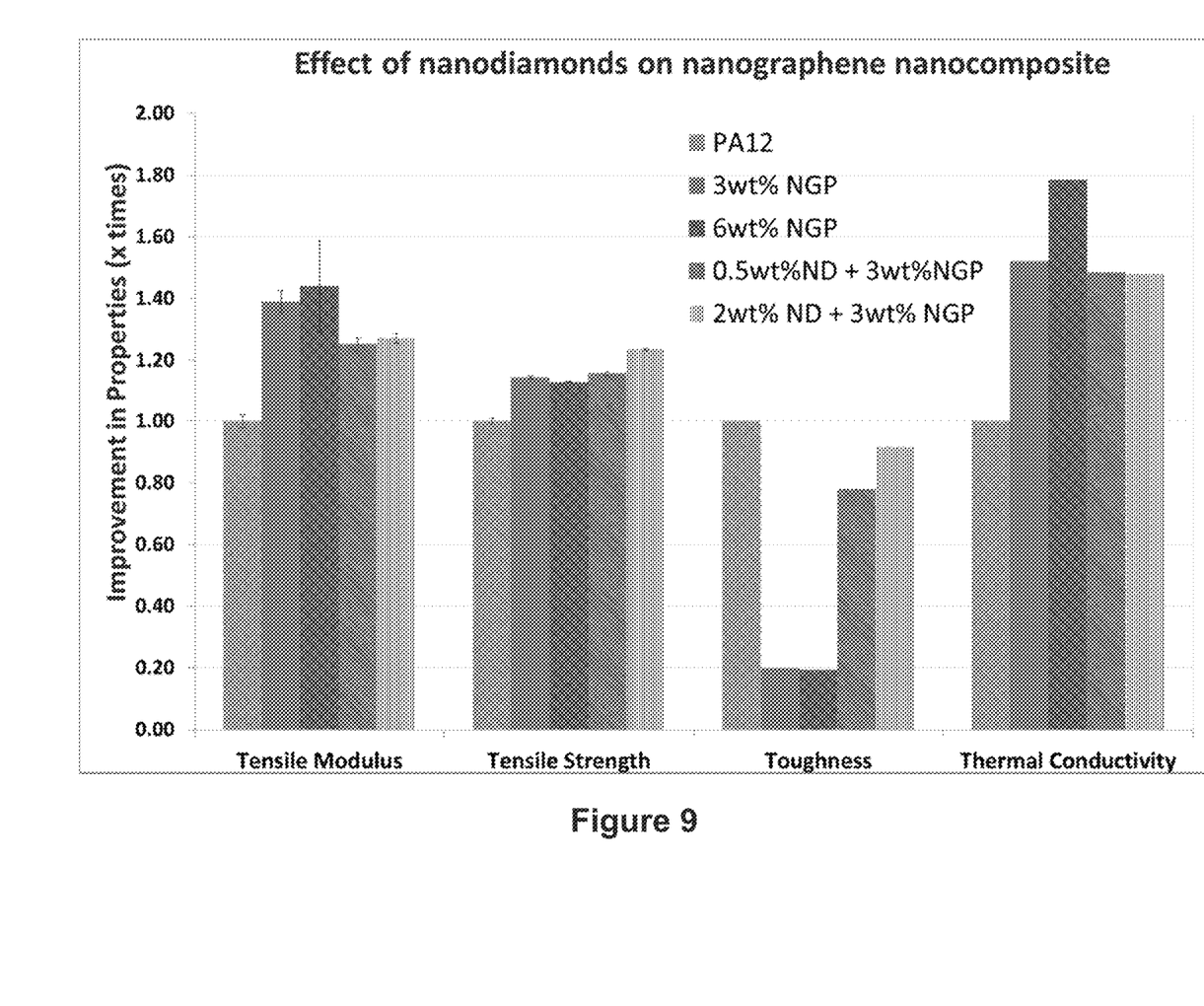
FIG. 9 is a graphical comparison of the effect on the structural properties of a composite when a nanodiamond additive is combined with a polymer/nanographene platelet matrix.

As shown in FIG. 9, the addition of nanodiamond material to the graphene nanocomposite improved the toughness that was lost when graphene alone was added to the Nylon 12, while maintaining other desirable properties that were made possible by the use of the graphene platelet material. Again, making this type of composite ideal for use in flexible components of fuel conveyance systems.

Example 3

In another example two samples were prepared. A first or control sample was prepared using 70% Nylon 12 and 30% micro-additive carbon fiber (commercially available as IM 100 from hexcel). A second sample was prepared using about 68% Nylon 12, about 30% carbon fiber, and about 2% nanodiamond.

Figure 10:
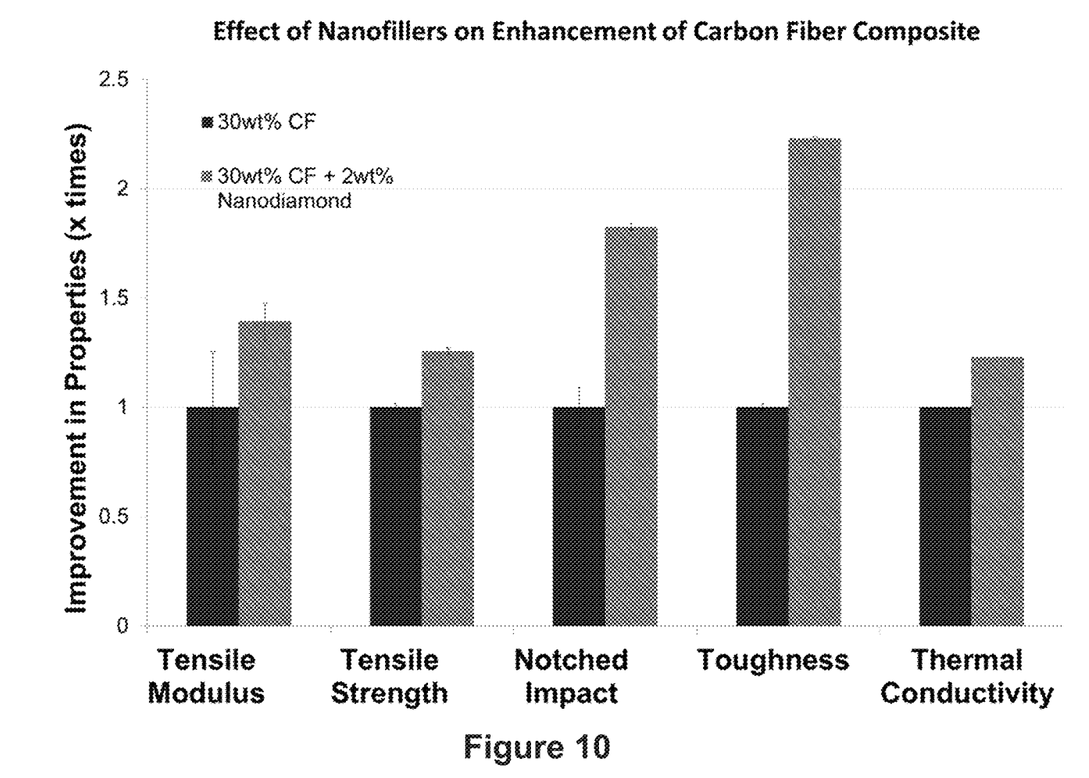
FIG. 10 is a graphical comparison of the effect on the structural properties of a composite when a spherical nanodiamond additive is combined with a polymer/carbon fiber matrix.

As shown in FIG. 10, the effect of the spherical filler was very pronounced when compared to the use of carbon fiber alone. The addition of 2% of a nanodiamond improved the modulus by 40%, strength by 30%, elongation and toughness by more than 200%, and impact by 180%. Improvements in these specific characteristics will be particularly useful to replace metal or rigid components in Aerospace, automotive, and industrial applications.

Example 4

In another example three samples were prepared, as described in Table II, using the methods described above.

TABLE II

|  | 1 | 2 | 3 |
|---|---|---|---|
| Nylon 12 (% by wt) | 100 | 96 | 98 |
| Carbon Nanotubes (% by wt) | — | 2 | 2 |
| Nanodiamond (% by wt) | — | 2 | — |
| Flow Aid (POSS) | 1 | 1 | 1 |

Figure 11:
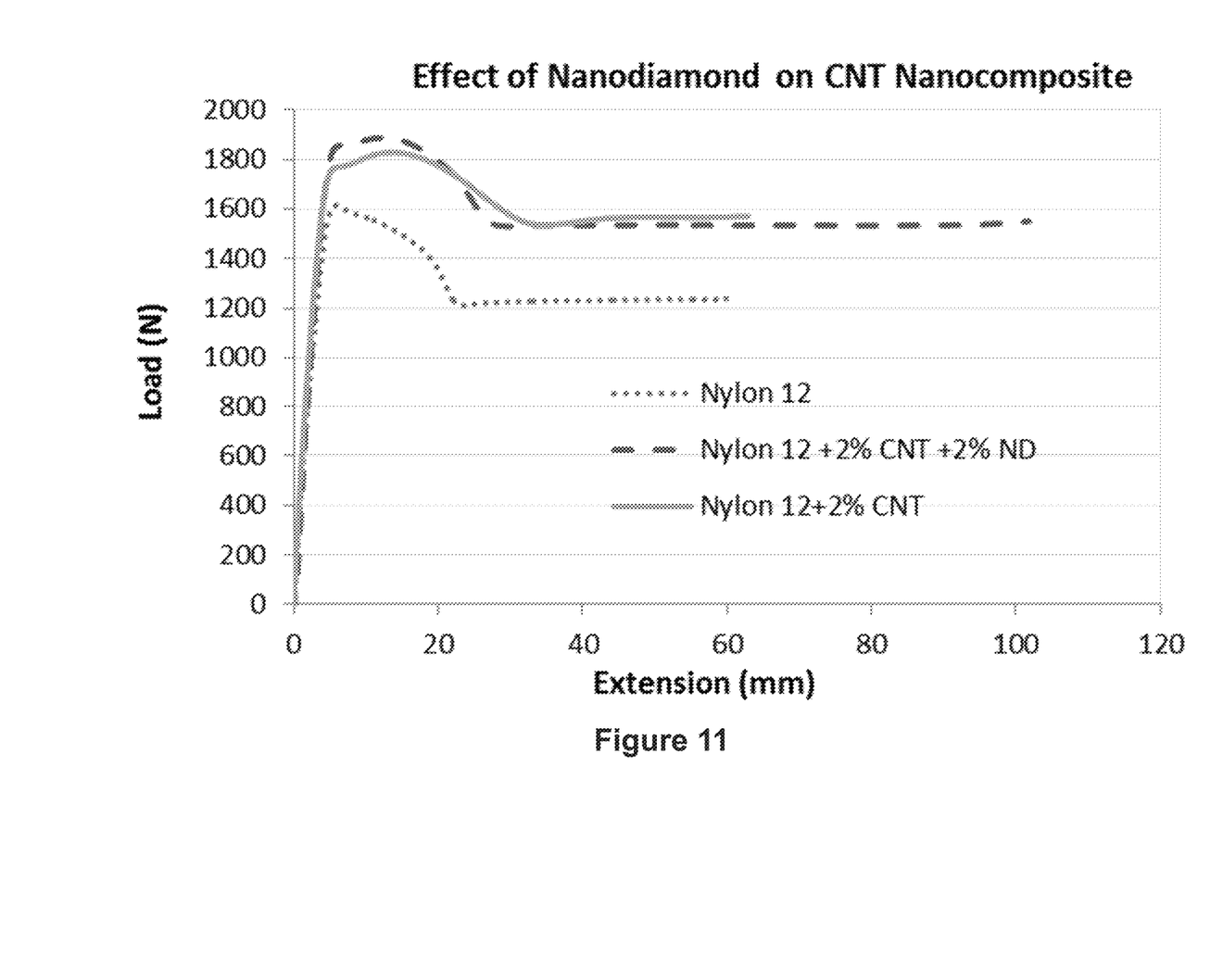
FIG. 11 is a graphical comparison of the effect on the structural properties of a composite when spherical nano-additives are combined with polymer/carbon nanotube or carbon fiber matrices.

As shown in FIG. 11, the addition of the nanodiamond to the carbon nanotube polymer mixture increases the elongation at break, and therefore the tensile toughness, while retaining the increase in strength and stiffness achieved by addition of carbon nanotubes.

It was also determined that the properties of a short fiber polymer composite, such as a polymer/carbon fiber composite, can be improved by adding nano-additives, as shown in Examples 5-7 below. As discussed above, the use of micro-additives, such as carbon fiber, with nano-additives may be particularly useful to replace known rigid fuel conveyance system components.

Example 5

In one example, three samples were prepared. The samples included a first or control sample made of 100% Nylon 12 (or Polyamide 12) (commercially available as Vestamid 1700 from Evonik Industries), a second sample including 70% Nylon 12 and 30% carbon fiber (commercially available as IM 100 from Hexcel), and a third sample including 68% Nylon 12, 30% carbon fiber, and 2% nanodiamond filler (commercially available as NB 90 (5 nm diameter) from NanoBlox, Inc.). The samples were prepared by dry blending the polymer pellets and fillers. The mixture was then extruded using a Haake Co. rotating twin screw extruder with a 16 mm diameter. The mixture was extruded above the melting point of the Nylon 12 to obtain a uniform dispersion of the composite material. The composite material was then dried to remove remaining moisture and injection molded into ASTM size bars or tubs for testing.

The tensile strength, tensile modulus and elongation were measured using ASTM D638 standard using Instron 3369, toughness was measured as the area under the stress-strain curve, notched impact was measured using Ceast 9000 and ASTM D266. Thermal Conductivity was measured using TPS 2500 instrument.

Figure 12:
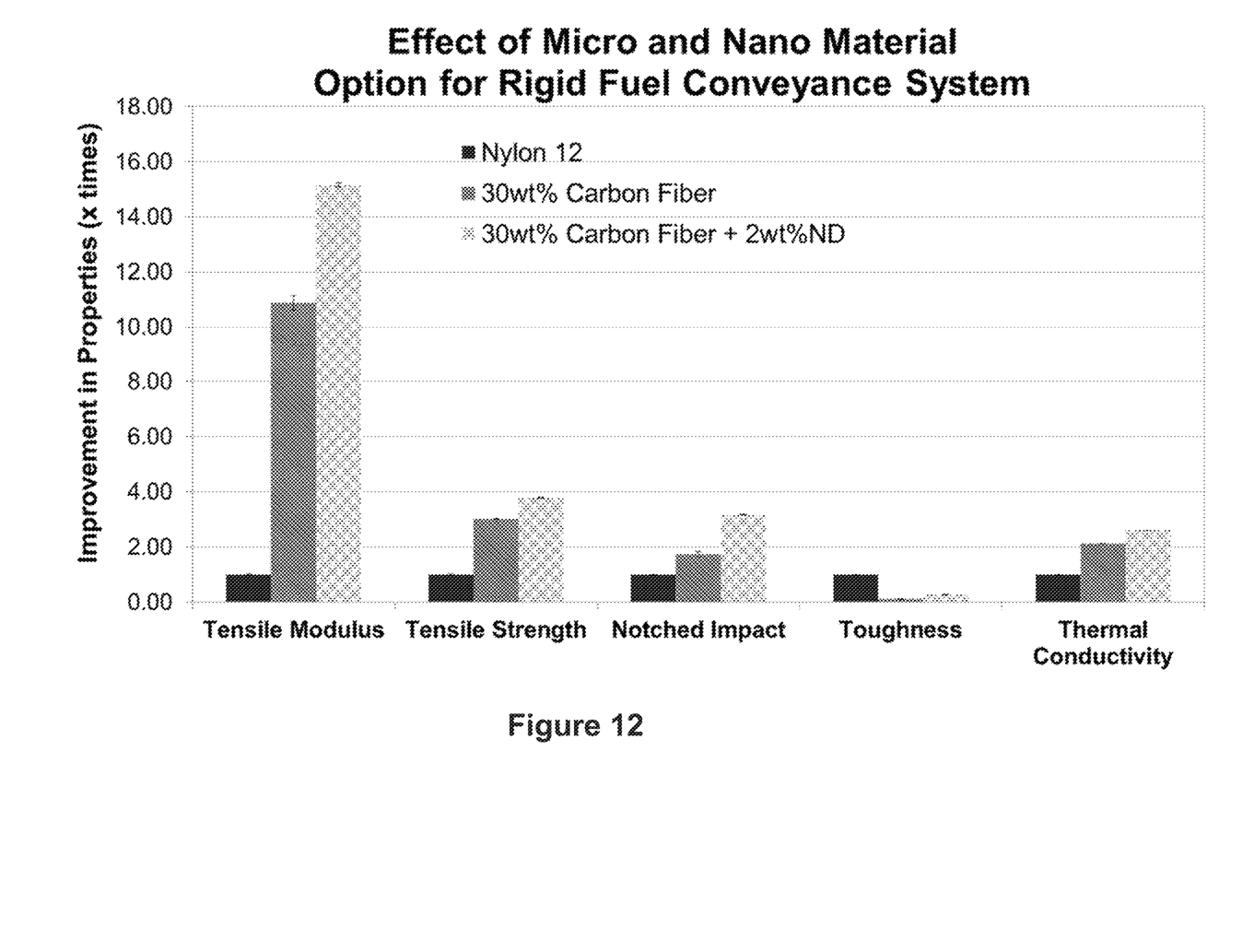
FIG. 12 is a graphical comparison of the effect on the structural properties of a composite when a nano-additive is combined with a carbon fiber and polymer matrix.

As shown in FIG. 12, adding 2% of the nanodiamond filler increased the tensile modulus, tensile strength, notched impact, and thermal conductivity of the short fiber composite material. However, the addition of the nanodiamond filler decreased the toughness of the composite compared to the control, but increased the toughness compared to the Nylon 12/carbon fiber sample.

Example 6

In another example, three samples were prepared. The samples included a first or control sample made of 100% Nylon 12, a second sample including 90% Nylon 12 and 10% carbon fiber, and a third sample including 88% Nylon 12, 10% carbon fiber, and 2% multiwall carbon nanotube filler (commercially available NC7000 (20 nm diameter) from Nanocyl). The samples were prepared as described above in Example 1.

Figure 13:
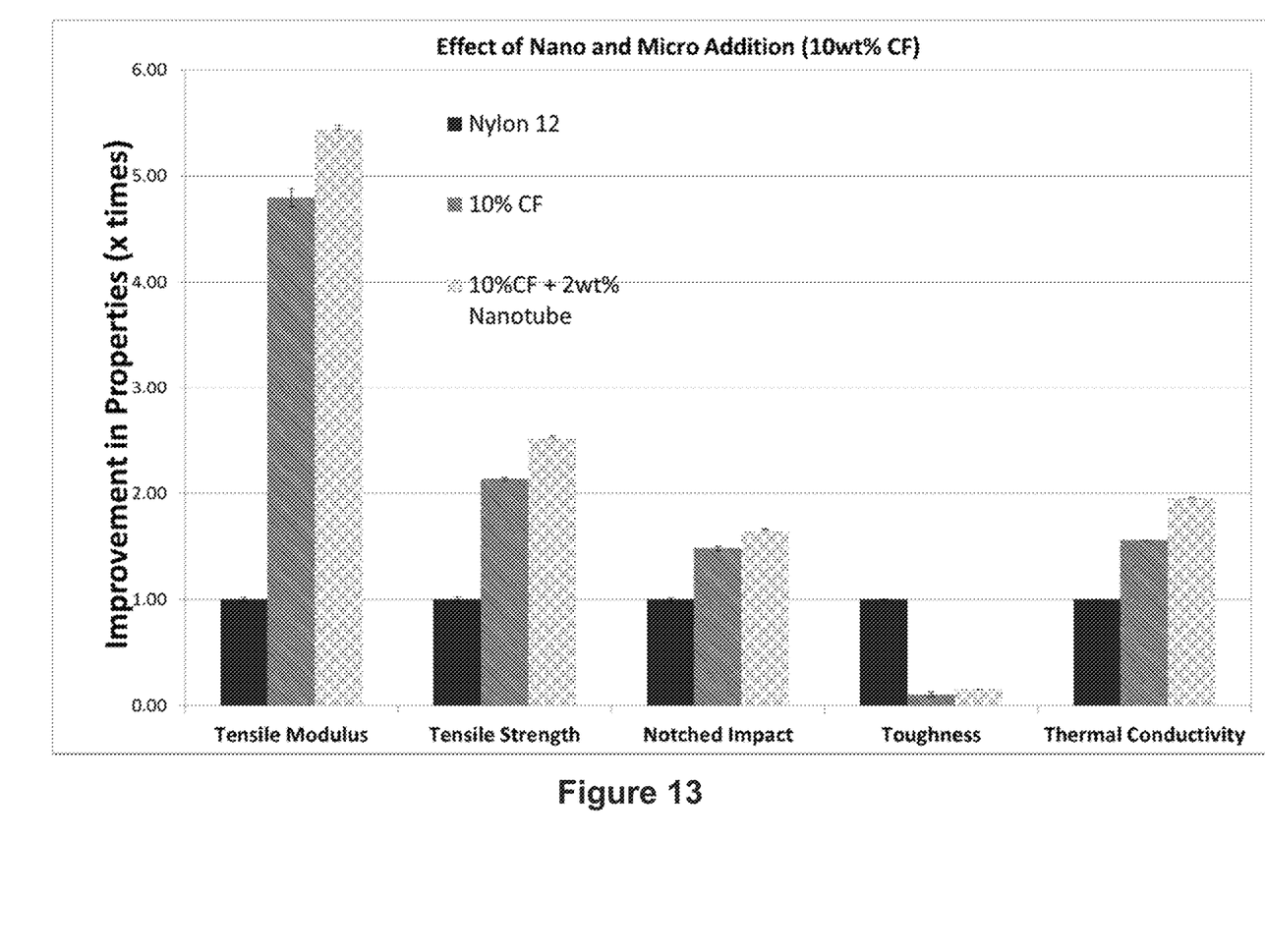
FIG. 13 is a graphical comparison of the effect on the structural properties of a composite when a nano-additive is combined with a carbon fiber and polymer matrix.

As shown in FIG. 13, the addition of the carbon nanotube filler improved the tensile modulus, strength, impact properties, toughness, and thermal conductivity of the material compared to the Nylon 12/carbon fiber sample.

Example 7

In yet another example, seven samples were prepared using the method described above. The composition of the samples are detailed in Table III below.

TABLE III

| Sample No. | 1 | 2 | 3 | 4 | 5 | 6 | 7 |
|---|---|---|---|---|---|---|---|
| Nylon 12 (% by wt) | 70 | 68 | 65 | 67 | 85 | 83 | 81 |
| Carbon Fiber (% by wt) | 30 | 30 | 30 | 30 | 15 | 15 | 15 |
| Carbon Nanotubes (% by wt) | — | — | 3 | — | — | — | 4 |
| Nanodiamond Filler (% by wt) | — | 2 | 2 | — | — | 2 | — |
| Nanographene Platelet Filler (% by wt) | — | — | — | 3 | — | — | — |
| Flow Aid (POSS) | — | 1 | 1 | 1 | — | 1 | 1 |

Figure 14:
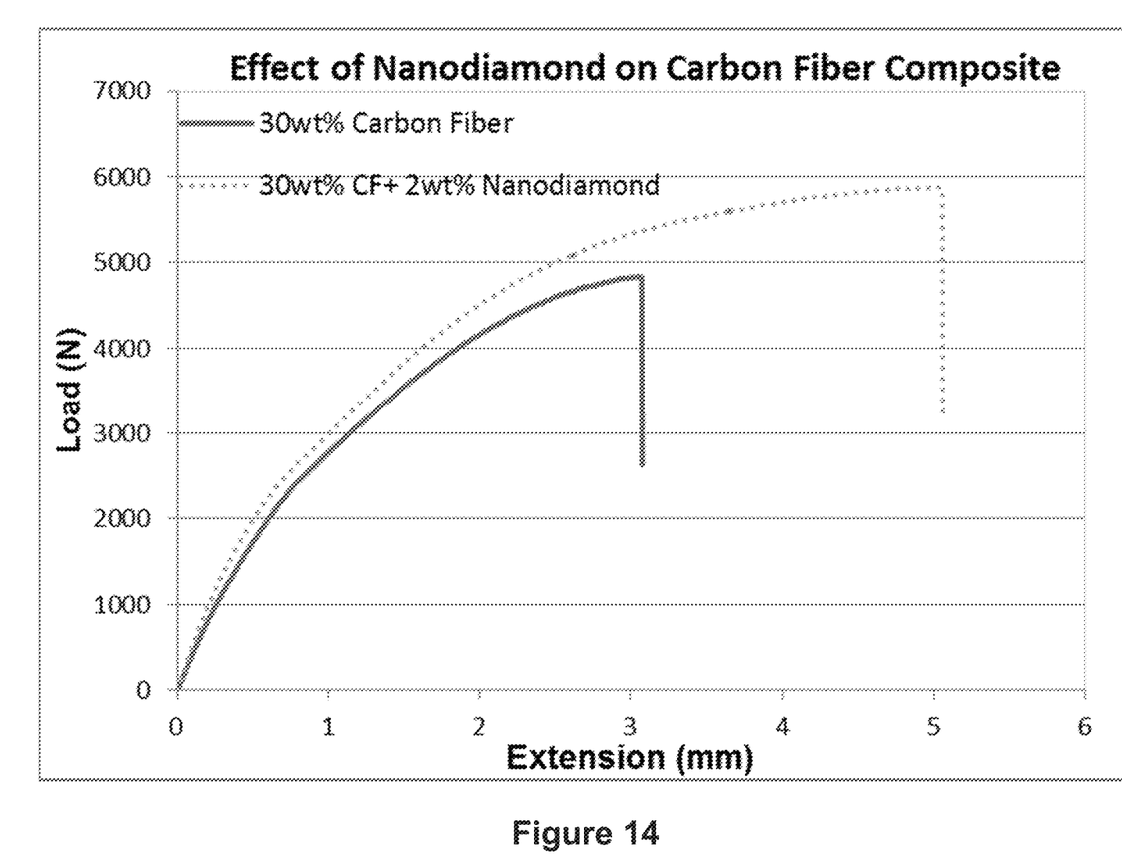
FIG. 14 is a graphical comparison of the effect on the structural properties of a composite when two nano-additives are combined with a carbon fiber and polymer matrix.

As shown in FIG. 14 and Table IV, below, by adding 2% of the nanodiamond additive and 3% of the carbon nanotube additive, as in Sample 3, desirable characteristics increase dramatically.

TABLE IV

| Sample No. | 1 | 2 | 3 | 4 | 5 | 6 | 7 |
|---|---|---|---|---|---|---|---|
| Tensile Strength (MPa) | 117.0 | 155.0 | 146.0 | 129.0 | 87.6 | 110.0 | 100.0 |
| Tensile Modulus (GPa) | 14.0 | 22.0 | 18.5 | 22.0 | 7.4 | 9.5 | 8.3 |
| Elongation at Break (%) | 2.2 | 3.7 | 4.0 | 1.1 | 3.2 | 5.3 | 4.6 |
| Toughness (J/m3) x10$^4$ | 527.0 | 1125.0 | 1153.0 | 454.0 | 471.0 | 947.0 | 806.0 |
| Impact (J/m) | 64.1 | 117.0 | 73.3 | 46.5 | 54.4 | 79.2 | 58.2 |
| Thermal Conductivity (W/mK) | 0.46 | 0.652 | 0.86 | 0.74 | 0.4621 | 0.5 | 0.56 |

Figure 15:
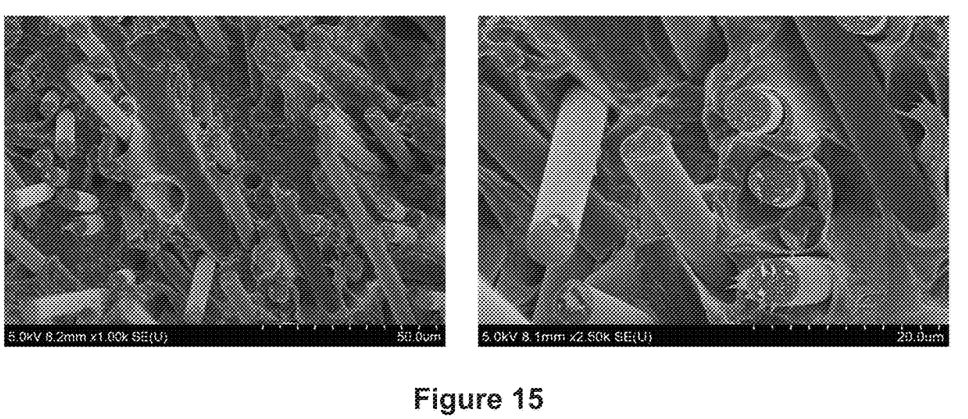
FIG. 15 are SEM Micrograph images of Nylon 12 with 30% by weight carbon fiber.
Figure 16:
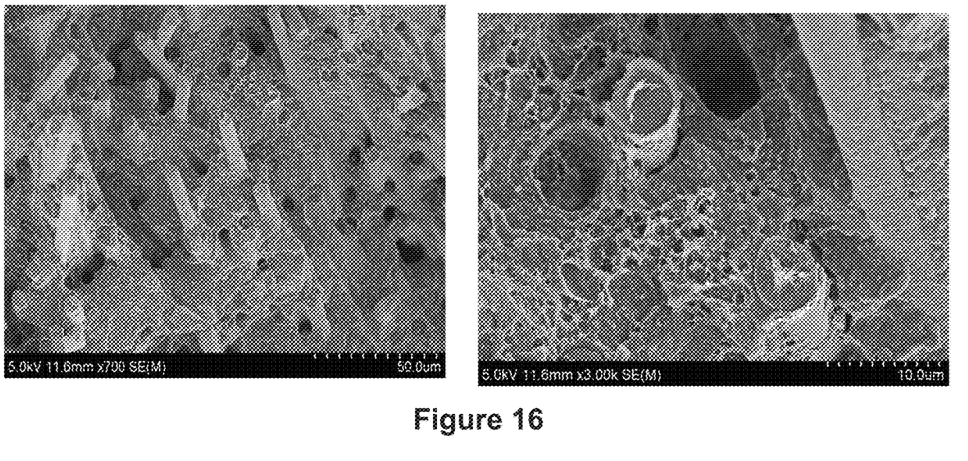
FIG. 16 are SEM Micrograph images of Nylon 12 with 30% by weight carbon fiber and a nano-additive.

And, as shown in FIGS. 15 and 16, comparing the adhesion property of the polymer matrix to the carbon fiber of samples 1 (FIG. 15) and 3 (FIG. 16), the addition of nano-additives improves the adhesion of the polymer matrix to the carbon fiber, resulting in enhanced properties.

For example, sample rigid tubes were prepared using 100% Nylon 12, 70% Nylon 12 and 30% carbon fiber, and 65% Nylon 12, 30% carbon fiber, 3% carbon nanotubes, and 2% nanodiamond. The burst pressure of each tube was measured and it was determined that the tube including the nano-additives had a burst pressure of over 5000 psi, as compared to the Nylon and Nylon/carbon fiber tubes with burst pressures of approximately 2000 psi and 3500 psi, respectively.

Similarly, samples tubes made of 100% PEEK, 96.5% PEEK and 3.5% carbon nanotubes, and 65% PEEK, 15% glass fiber, 15% carbon fiber, 3% carbon nanotube, and 2% nanodiamond were prepared and their burst pressures compared. It was found that the combination of the nano-additives with the micro-additives increased the burst pressure of the PEEK or PEEK/carbon nanotube tubes from around 5000-5500 psi to about 7600 psi.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A solid polymer composite material, comprising from about 60 wt % to about 99 wt % of a cured polymer matrix, about 0.2 wt % to about 5 wt % of at least one spherical nano-additive comprising nanodiamonds and from about 0.5 wt % to about 6 wt % of at least one non-spherical nano-additive.

2. The solid polymer composite material of claim 1, wherein the cured polymer matrix comprises one of polyamide, polyetherimide, polyamidemide, polyphenylsulfone, polyetheretherketone, polyimide, epoxy, polycarbonate, polysulfone, polyethersulfone, polyethylene terephthalate, polythalamaide, polyetherketone, polyetherketoneketone, polybenzimidazole, polytetrafluoroethylene, ethylenetetrafluoroethylene, other fluoropolymers and fluoroelastomers, and combinations thereof.

3. The solid polymer composite material of claim 1, wherein the cured polymer matrix comprises polyamide, polyetheretherketone, or combinations thereof.

4. The solid polymer composite material of claim 1, wherein the at least one spherical nano-additive further comprises one of titanium oxide, zirconium oxide, silicon carbide, silicon nanoparticles, aluminum oxide nanoparticles, silica nanoparticles, and combinations thereof.

5. The solid polymer composite material of claim 1, wherein the at least one non-spherical nano-additive comprises one of carbon nanotubes, graphene, alumina, nanoclay, boron nitride, carbon nanofibers, boron nanotubes, halloysite nanotubes, graphite, and aluminum nitride.

6. The solid polymer composite material of claim 1, further comprising from about 5 wt % to about 35 wt % of a micro-additive, wherein the micro-additive comprises one of carbon fiber, glass fiber, carbon black, talc, mica, and basalt.

7. The solid polymer composite material of claim 1, wherein the material is configured as part of an airframe or a non-metallic fuel conveyance system for an aircraft.

8. The solid polymer composite material of claim 1, wherein the at least one non-spherical nano-additive comprises one of carbon nanotubes and graphene, and wherein the micro-additive comprises carbon fiber.

9. A solid polymer composite material, comprising from about 60 to about 99 wt % of a cured polymer matrix, about 0.3 wt % to about 6 wt % of a spherical nano-additive comprising nanodiamonds, a non-spherical nano-additive comprising one of tubular and platelet nano-additives, and from about 15 wt % to about 35 wt % of a short fiber micro-additive.

10. The solid polymer composite material of claim 9, wherein the cured polymer matrix comprises one of polyamide, polyetherimide, polyamidemide, polyphenylsulfone, polyetheretherketone, polyimide, epoxy, polycarbonate, polysulfone, polyethersulfone, polyethylene terephthalate, polythalamaide, polyetherketone, polybenzimidazole, polytetrafluoroethylene, ethylenetetrafluoroethylene, other fluoropolymers and fluoroelastomers, and combinations thereof.

11. The solid polymer composite of claim 9, wherein the cured polymer matrix comprises polyamide, polyetheretherketone, or combinations thereof.

12. The solid polymer composite material of claim 9, wherein the non-spherical nano-additive further comprises one of titanium oxide, zirconium oxide, silicon carbide, silicon nanoparticles, aluminum oxide nanoparticles, silica nanoparticles, carbon nanotubes, graphene, alumina, nanoclay, boron nitride, carbon nanofibers, boron nanotubes, halloysite nanotubes, graphite, aluminum nitride, and combinations thereof.

13. The solid polymer composite of claim 9, wherein the short fiber micro-additive comprises one of carbon fiber, glass fiber, carbon black, talc, mica, and basalt.

14. The solid polymer composite material of claim 9, wherein the material is configured as part of an airframe or a non-metallic fuel conveyance system for an aircraft.

15. The solid polymer composite material of claim 9, wherein the short fiber micro-additive comprises carbon fiber.

16. A solid polymer composite material, comprising from about 60 to about 99 of a cured polymer matrix, about 0.3 wt % to about 6 wt % of a first nano-additive comprising nanodiamonds and from about 0.3 wt % to about 6 wt % of a second nano-additive.

17. The solid polymer composite material of claim 16, further comprising from about 15 wt % to about 30 wt % of a micro-additive.

18. The solid polymer composite material of claim 17, wherein the micro-additive comprises one of carbon fiber, glass fiber, carbon black, talc, mica, and basalt.

19. The solid polymer composite material of claim 16, wherein the cured polymer matrix comprises one of polyamide, polyetherimide, polyamidemide, polyphenylsulfone, polyetheretherketone, polyimide, epoxy, polycarbonate, polysulfone, polyethersulfone, polyethylene terephthalate, polythalamaide, polyetherketone, polybenzimidazole, polytetrafluoroethylene, ethylenetetrafluoroethylene, other fluoropolymers and fluoroelastomers, and combinations thereof.

20. The solid polymer composite material of claim 16, wherein the cured polymer matrix comprises polyamide, polyetheretherketone, or combinations thereof.

21. The solid polymer composite material of claim 16, wherein the first nano-additive further comprises one of and the second nano-additive comprises one of titanium oxide, zirconium oxide, silicon carbide, silicon nanoparticles, aluminum oxide nanoparticles, silica nanoparticles, carbon nanotubes, graphene, alumina, nanoclay, boron nitride, carbon nanofibers, boron nanotubes, halloysite nanotubes, graphite, aluminum nitride, and combinations thereof.

22. The solid polymer composite material of claim 16, wherein the material is configured as part of an airframe or a non-metallic fuel conveyance system for an aircraft.

23. The solid polymer composite material of claim 16, further comprising from about 15 wt % to about 30 wt % of a micro-additive, wherein the second nano-additive corresponds to one of a tubular nano-additive and a platelet nano-additive.

* * * * *